United States Patent [19]
Brinson et al.

[11] Patent Number: 6,013,235
[45] Date of Patent: Jan. 11, 2000

[54] CONVERSION OF DIRECT PROCESS HIGH-BOILING RESIDUE TO MONOSILANES

[75] Inventors: Jonathan Ashley Brinson, Vale of Glamorgan, United Kingdom; Bruce Robert Crum, Madison, Ind.; Robert Frank Jarvis, Jr., Midland, Mich.

[73] Assignee: Dow Corning Corporation, Midland, Mich.

[21] Appl. No.: 09/356,659

[22] Filed: Jul. 19, 1999

[51] Int. Cl.[7] ................................................. C01B 33/08
[52] U.S. Cl. ........................... 423/342; 423/347; 556/468
[58] Field of Search ..................................... 423/342, 347

[56] References Cited

U.S. PATENT DOCUMENTS

| | | | |
|---|---|---|---|
| 2,380,995 | 8/1945 | Rochow | 260/607 |
| 2,488,487 | 11/1949 | Barry et al. | 260/448.2 |
| 2,598,435 | 5/1952 | Mohler et al. | 260/448.2 |
| 2,606,811 | 8/1952 | Wagner | 23/14 |
| 2,681,355 | 6/1954 | Barry et al. | 260/448.2 |
| 3,639,105 | 2/1972 | Atwell et al. | 23/366 |
| 4,079,071 | 3/1978 | Neale | 260/448.2 |
| 4,393,229 | 7/1983 | Ritzer et al. | 556/430 |
| 5,175,329 | 12/1992 | Bokerman et al. | 556/467 |
| 5,329,038 | 7/1994 | Cadwick et al. | 556/474 |
| 5,430,168 | 7/1995 | Ferguson et al. | 556/467 |
| 5,627,298 | 5/1997 | Freeburne et al. | 556/467 |

*Primary Examiner*—Paul F. Shaver
*Attorney, Agent, or Firm*—Melvin D. Fletcher

[57] ABSTRACT

A process for the production of monosilanes from the high-boiling residue resulting from the reaction of hydrogen chloride with silicon metalloid in a process typically referred to as the "direct process." The process comprises contacting a high-boiling residue resulting from the reaction of hydrogen chloride and silicon metalloid, with hydrogen gas in the presence of a catalytic amount of aluminum trichloride effective in promoting conversion of the high-boiling residue to monosilanes. The present process results in conversion of the high-boiling residue to monosilanes. At least a portion of the aluminum trichloride catalyst required for conduct of the process may be formed in situ during conduct of the direct process and isolation of the high-boiling residue.

17 Claims, No Drawings

CONVERSION OF DIRECT PROCESS HIGH-BOILING RESIDUE TO MONOSILANES

This invention was made with United States Government support under DOE Contract DE-FC04-94AL99566 awarded by the Department of Energy. The United States Government has certain rights in the invention.

BACKGROUND OF INVENTION

The present invention is a process for the production of monosilanes from the high-boiling residue resulting from the reaction of hydrogen chloride with silicon metalloid in a process typically referred to as the "direct process." The process comprises contacting a high-boiling residue resulting from the reaction of hydrogen chloride and silicon metalloid, with hydrogen gas in the presence of a catalytic amount of aluminum trichloride effective in promoting conversion of the high-boiling residue to monosilanes. At least a portion of the aluminum trichloride catalyst required for conduct of the process may be formed in situ during conduct of the direct process and isolation of the high-boiling residue.

In the preparation of trichlorosilane by the direct process, a complex mixture is formed which is typically distilled to separate trichlorosilane from other components present in the mixture. After the trichlorosilane is distilled from the mixture, a high-boiling residue remains which boils above 80° C. and above the trichlorosilane boiling point. The high-boiling residue can constitute as much as ten weight percent of the trichlorosilane in current commercial operations for the direct process. Therefore, it is desirable to convert the high-boiling residue into commercially valuable products to reduce by-product disposal and to improve raw material utilization.

The "direct process" is well described in the patent literature, for example, in Rochow, U.S. Pat. No. 2,380,995 and Barry et al., U.S. Pat. No. 2,488,487. The high-boiling fraction remaining after the monosilanes overhead distillation is a complex mixture comprising higher boiling silicon containing compounds which have, for example, SiSi, SiOSi, and SiCSi linkages in the molecules. The high-boiling fraction may also contain particulate silicon and metals or compounds thereof. Typical high-boiling residues obtained from the direct process distillation product are described, for example, in Mohler et al., U.S. Pat. No. 2,598,435 and Barry et al., U.S. Pat. No. 2,681,355.

Wagner, U.S. Pat. No. 2,606,811, teaches a hydrogenation process where a compound containing a halogen and the Si—Si bond is heated to a temperature of at least 300° C. in the presence of hydrogen. The resultant products are monosilanes, however there is no teaching of aluminum trichloride as a catalyst.

Atwell et al., U.S. Pat. No. 3,639,105, describe a process where hydrosilanes are produced by contacting a disilane with hydrogen gas under pressure and heating the mixture in the presence of a transition metal catalyst such as palladium on charcoal. Atwell et al. state that the disilane may be part of a mixture from the direct process.

Neale, U.S. Pat. No. 4,079,071, describes a process for preparing hydrosilanes in high yields by reacting methyl-chloropolysilanes with hydrogen gas under pressure at a temperature of from 25° C. to about 350° C. in the presence of a copper catalyst. Neale states that the methylchloropolysilanes can be those typically created as direct process by-products. Useful copper catalysts described by Neale include copper metal, copper salts, and complexes of copper salts with organic ligands.

Ritzer et al., U.S. Pat. No. 4,393,229, describe a process for converting alkyl-rich disilanes in a residue obtained from the manufacture of alkylhalosilanes to halogen-rich polysilanes. The process comprises treating an alkyl-rich disilane-containing residue with an alkyltrihalosilane or silicon tetrahalide in the presence of a catalyst and a catalytic amount of a hydrosilane reaction promoter at an elevated temperature. Ritzer et al. teach aluminum trichloride as a useful catalyst in their process when used with a hydrosilane promoter. Ritzer et al. further teach that the resulting halogen-rich polysilanes can, in a separate step, be cleaved to form monosilanes.

Bokerman et al., U.S. Pat. No. 5,175,329, describe a process for the production of organosilanes from the high-boiling residue resulting from the direct process that results in a net consumption of organotrichlorosilane. In the process, the high-boiling residue is contacted with an organotrichlorosilane and hydrogen gas in the presence of both a hydrogenation catalyst and a redistribution catalyst.

Ferguson et al., U.S. Pat. No. 5,430,168, describe a process for the production of monosilanes from the high-boiling residue resulting from the, "direct process", reaction of methyl chloride and silicon metalloid. The process comprises forming a mixture comprising an organotrihalosilane and high-boiling residue in the presence of hydrogen gas and a catalytic amount of aluminum trichloride. The process results in consumption of the organotrihalosilane and conversion of the high-boiling residue to useful monosilanes.

The present invention provides a process where a high-boiling residue comprising disilanes resulting from producing trichlorosilane is converted into commercially useful monosilanes. The process comprises contacting a non-methyl containing high-boiling residue resulting from the reaction of hydrogen chloride and silicon metalloid with, hydrogen gas in the presence of a catalytic amount of aluminum trichloride. Furthermore, at least a portion of the catalyst in the present process can be formed in situ during conduct of the direct process and isolation of the high-boiling residue.

SUMMARY OF INVENTION

The present invention is a process for the production of monosilanes from the high-boiling residue resulting from the reaction of hydrogen chloride with silicon metalloid in a process typically referred to as the "direct process." The process comprises contacting a high-boiling residue resulting from the reaction of hydrogen chloride and silicon metalloid, with hydrogen gas in the presence of a catalytic amount of aluminum trichloride effective in promoting conversion of the high-boiling residue to monosilanes. The present process results in conversion of the high-boiling residue to desirable chlorosilanes. At least a portion of the catalyst required for conduct of the process may be formed in situ during conduct of the direct process and isolation of the high-boiling residue.

DETAILED DESCRIPTION OF INVENTION

The present invention is a process for the production of monosilanes from the high-boiling residue resulting from the reaction of hydrogen chloride with silicon metalloid. The process comprises contacting a high-boiling residue comprising disilanes described by formula $H_bSi_2Cl_{6-b}$ resulting from the reaction of hydrogen chloride and silicon metalloid, with hydrogen gas at a pressure of about 345 kPa to 68,900 kPa in the presence of a catalytic amount of aluminum trichloride effective in promoting conversion of the high-boiling residue to monosilanes at a temperature within a range of about 150° C. to 500° C., where b=0 to 4.

The present process may be run in any standard pressurizable reactor suitable for contact with chlorosilanes. The process may be run as a batch process or as a continuous process. The process may be run, for example, in a continuous stirred-tank reactor, a bubble-column reactor, a trickle-bed reactor or a plug-flow reactor.

The high-boiling residue for use in the present process is one with a boiling point above about 80° C. and results from the distillation of trichlorosilane from the reaction product of hydrogen chloride and silicon metalloid. The high-boiling residue useful in the present process comprises disilanes described by formula $H_bSi_2Cl_{6-b}$, where b=0 to 4. The preferred disilanes are $Cl_6Si_2$ and $HCl_5Si_2$. A typical composition for such a high-boiling residue can comprise: 68 wt % of disilanes, such as $Cl_6Si_2$, $HCl_5Si_2$, $H_2Cl_4Si_2$, $H_3Cl_3Si_2$, and $H_4Cl_2Si_2$; 31 wt % disiloxanes, such as $HCl_5Si_2O$, $Cl_6Si_2O$, $H_2Cl_4Si_2O$, $H_3Cl_3Si_2O$, and $H_4Cl_2Si_2O$; 0.5 wt % percent other high-boiling silicon-containing compounds; and 0.5 wt % solid particulate containing silicon, low levels of metals such as aluminum, calcium, iron and compounds thereof.

The high-boiling residue is contacted with hydrogen gas at a pressure of about 345 kPa to 68,900 kPa. Preferred is a hydrogen gas pressure of about 2,000 kPa to 10,000 kPa. More preferred is a hydrogen gas pressure of about 4,000 kPa to 7,500 kPa. The weight ratio of the high-boiling residue to the hydrogen gas is within a range of about 0.1:1 to 1000:1. Preferred is when the weight ratio of the high-boiling residue to hydrogen gas is within a range of about 1:1 to 500:1. Most preferred is when the weight ratio of the high-boiling residue to hydrogen gas is within a range of about 20:1 to 200:1.

In an alternative embodiment of the invention, disilanes described by formula $H_bSi_2Cl_{6-b}$, where b is as previously defined may be recovered by distillation from the high-boiling residue and contacted with hydrogen gas at a pressure of about 345 kPa to 68,900 kPa in the presence of a catalytic amount of aluminum trichloride at a temperature within a range of about 150° C. to 500° C.

The high-boiling residue is contacted with hydrogen gas in the presence of a catalytic amount of aluminum trichloride. The term "catalytic amount" is understood to mean an amount of aluminum trichloride sufficient to promote the conversion of disilanes in the high-boiling residue to monosilanes. More specifically, the catalytic amount of aluminum trichloride is the amount sufficient to promote the conversion of disilanes such as, for example, $Cl_6Si_2$ and $HCl_5Si_2$ in the high-boiling residue to silicon tetrachloride and trichlorosilane. Preferably, the aluminum trichloride concentration is about 0.01 to 15 weight percent, based on the combined weight of the aluminum trichloride and the high-boiling residue. Most preferred, the aluminum trichloride concentration is about 0.01 to 2 weight percent on the same basis.

The aluminum trichloride may be added to the process as the compound or may be formed in situ by the addition of materials that form aluminum trichloride. All or a portion of the catalytic amount of aluminum trichloride may be formed in situ during conduct of the direct process and distillation to form the high-boiling residue. The source of the aluminum and chlorine necessary to form the aluminum trichloride can be the raw materials used in the direct process, particularly the silicon metalloid and hydrogen chloride feed. The aluminum trichloride catalyst amount can be a combination of added aluminum trichloride and in situ formed aluminum trichloride remaining in the mixture as isolated from the direct process.

The present process can be conducted at a temperature within a range of about 150° C. to 500° C. Preferred is a temperature within a range of about 200° C. to 425° C. Most preferred is a temperature within a range of about 225° C. to 350° C.

The monosilanes produced by the present process are described by formula $H_ySiCl_{4-y}$, where y=0 to 4. The preferred monosilanes are silicon tetrachloride and trichlorosilane. The monosilanes can be recovered by standard methods for separating liquid mixtures, for example, distillation.

The following example is provided to illustrate the present invention. This example is not intended to limit the scope of the claims provided herein.

EXAMPLE 1

The ability to convert a high-boiling residue with in situ formed aluminum trichloride as catalyst was evaluated in a stirred-tank batch reactor. The reactor was a 450 ml, pneumatically stirred, Parr Bomb reactor. A 100 gram sample of high-boiling residue resulting from the reaction of hydrogen chloride with silicon metalloid was added to the reactor. The aluminum trichloride present was formed in situ during preparation and isolation of the high-boiling residue. Hydrogen gas at 8280 kPa was added to the reactor while stirring and the reactor was heated to about 300° C. for about 2 hours. A sample from the reactor was analyzed by gas chromatography (GC) using a thermal conductivity detector (TCD). The high-boiling residue, initial composition weight percents and final compositions weight percent are reported in Table 1.

TABLE 1

| | HIGH-BOILING RESIDUE | |
|---|---|---|
| Composition | Initial Composition Weight % | Final Composition Weight % |
| $HSiCl_3$ | — | 8.7 |
| $SiCl_4$ | 77.4 | 75.2 |
| $Cl_3SiSiCl_3$ | 14.9 | 9.4 |
| undetermined | 7.7 | 6.7 |

We claim:

1. A process for converting a high-boiling residue resulting from the reaction of hydrogen chloride with silicon metalloid to monosilanes, the process comprising: contacting a high-boiling residue comprising disilanes described by formula $H_bSi_2Cl_{6-b}$ resulting from the reaction of hydrogen chloride and silicon metalloid, with hydrogen gas at a pressure of about 345 kPa to 68,900 kPa in the presence of a catalytic amount of aluminum trichloride effective in promoting conversion of the high-boiling residue to monosilanes at a temperature within a range of about 150° C. to 500° C., where b=0 to 4.

2. A process according to claim 1 where the monosilanes are described by formula $H_ySiCl_{4-y}$, where y=0 to 4.

3. A process according to claim 2, where the monosilanes are silicon tetrachloride or trichlorosilane.

4. A process according to claim 1, where the high-boiling residue is a distillation fraction resulting from the distillation of the reaction product of hydrogen chloride and silicon metalloid.

5. A process according to claim 1, where the weight ratio of the high-boiling residue to the hydrogen gas is within a range of about 0.01:1 to 1000:1.

6. A process according to claim 1, where the weight ratio of the high-boiling residue to the hydrogen gas is within a range of about 1:1 to 500:1.

7. A process according to claim 1, where the weight ratio of the high-boiling residue to the hydrogen gas is within a range of about 20:1 to 200:1.

8. A process according to claim 1, where the hydrogen gas pressure is within a range of about 2000 kPa to 10,000 kPa.

9. A process according to claim 1, where the hydrogen gas pressure is within a range of about 4,000 kPa to 7,500 kPa.

10. A process according to claim 1, where the aluminum trichloride concentration is within a range of about 0.01 to 15 weight percent based on the combined weight of the aluminum trichloride and the high-boiling residue.

11. A process according to claim 1, where aluminum trichloride concentration is within a range of about 0.01 to 2 weight percent based on the combined weight of the aluminum trichloride and the high-boiling residue.

12. A process according to claim 1, where at least a portion of the aluminum trichloride is formed in situ during formation of the high-boiling residue.

13. A process according to claim 1, where the temperature is within a range of about 200° C. to 425° C.

14. A process according to claim 1, where the temperature is within a range of about 225° C. to 350° C.

15. A process for converting disilanes resulting from the reaction of hydrogen chloride with silicon metalloid to monosilanes, the process comprising: contacting disilanes described by formula $H_bSi_2Cl_{6-b}$, resulting from the reaction of hydrogen chloride and silicon metalloid, with hydrogen gas at a pressure of about 345 kPa to 68,900 kPa in the presence of a catalytic amount of aluminum trichloride effective in promoting conversion of the disilanes to monosilanes at a temperature within a range of about 150° C. to 500° C., where b=0 to 4.

16. A process according to claim 15 where the monosilanes are described by formula $H_ySiCl_{4-y}$, where y=0 to 4.

17. A process according to claim 16, where the monosilanes are silicon tetrachloride or trichlorosilane.

* * * * *